(12) United States Patent
Logan et al.

(10) Patent No.: US 10,900,422 B2
(45) Date of Patent: Jan. 26, 2021

(54) HEAT EXCHANGER SYSTEM FOR AIRCRAFT AND ASSOCIATED METHOD OF OPERATION

(71) Applicant: PRATT & WHITNEY CANADA CORP., Longueuil (CA)

(72) Inventors: John Adam Logan, Toronto (CA); Marc Jordan Adique, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 644 days.

(21) Appl. No.: 15/420,148

(22) Filed: Jan. 31, 2017

(65) Prior Publication Data

US 2018/0215479 A1    Aug. 2, 2018

(51) Int. Cl.
| | | |
|---|---|---|
| F02C 7/224 | (2006.01) |
| F02C 9/28 | (2006.01) |
| F02C 7/16 | (2006.01) |
| F02C 9/18 | (2006.01) |
| F02C 7/14 | (2006.01) |

(52) U.S. Cl.
CPC ............... *F02C 9/28* (2013.01); *F02C 7/14* (2013.01); *F02C 7/16* (2013.01); *F02C 7/224* (2013.01); *F02C 9/18* (2013.01)

(58) Field of Classification Search
CPC ...... F02C 7/14; F02C 7/224; F05D 2260/606; F28F 2250/06
See application file for complete search history.

(56) References Cited

U.S. PATENT DOCUMENTS

| | | | |
|---|---|---|---|
| 6,938,421 B2 | 9/2005 | Foster-Pegg | |
| 8,397,487 B2 | 3/2013 | Sennoun et al. | |
| 9,239,005 B2 | 1/2016 | Strecker et al. | |
| 2016/0003160 A1* | 1/2016 | Hagshenas | F02C 7/224 |
| | | | 210/769 |
| 2016/0024968 A1* | 1/2016 | Stearns | F01D 25/12 |
| | | | 60/39.08 |

* cited by examiner

*Primary Examiner* — Scott J Walthour
(74) *Attorney, Agent, or Firm* — Norton Rose Fulbright Canada LLP

(57) ABSTRACT

The heat exchanger system can have a first conduit extending from at least one first conduit inlet through a heat exchanger to at least two first conduit outlets; a second conduit extending from at least one second inlet through the heat exchanger to at least one second outlet, the first and second conduits disposed adjacent to one another in heat exchange engagement within the heat exchanger; and a bypass conduit extending from the first conduit between the at least one first inlet and the heat exchanger to the first conduit between the heat exchanger and at least one of said at least two first outlets.

20 Claims, 4 Drawing Sheets

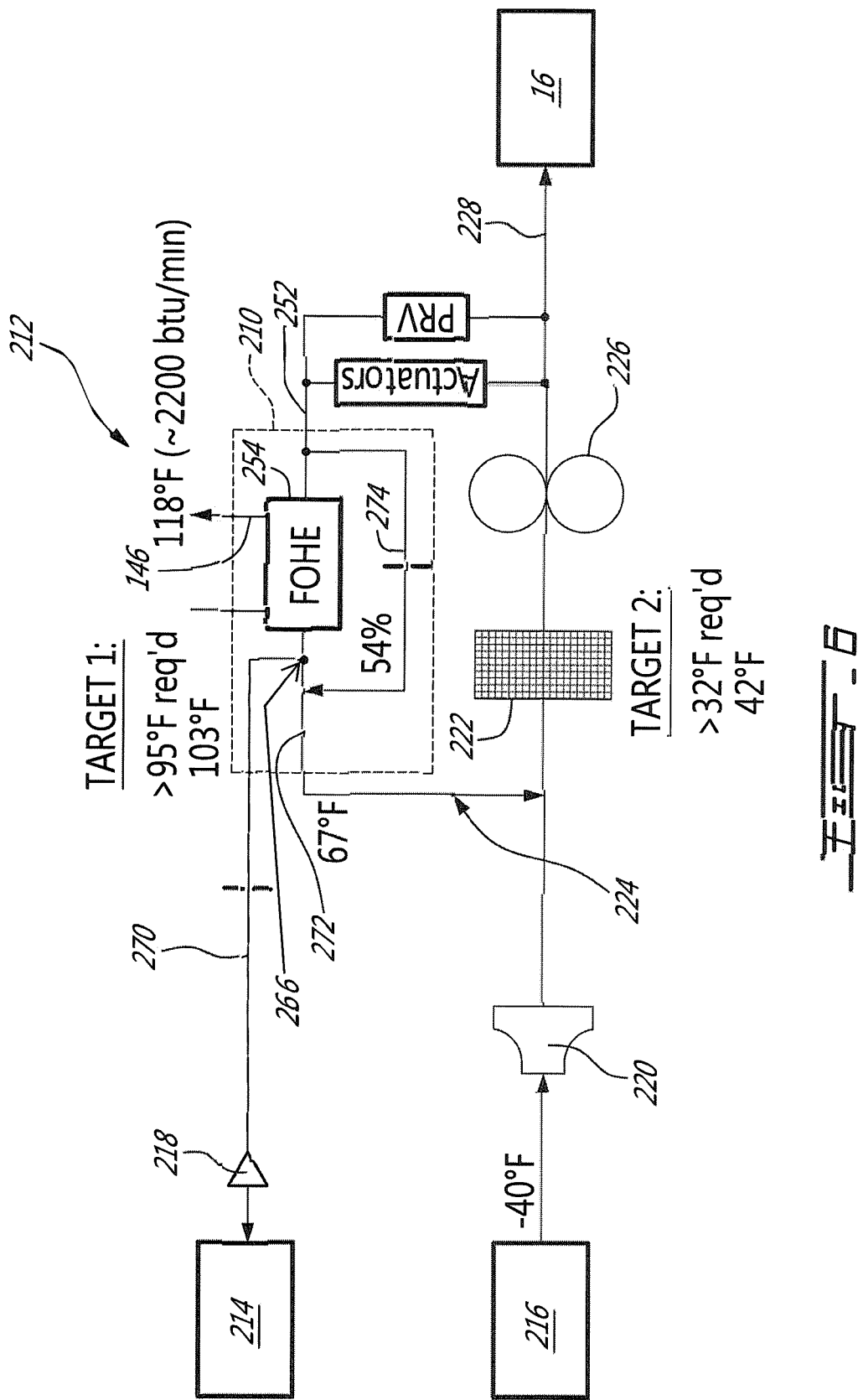

HEAT EXCHANGER SYSTEM FOR AIRCRAFT AND ASSOCIATED METHOD OF OPERATION

TECHNICAL FIELD

The application related generally to aircrafts and, more particularly, to a heat exchanger system for use on an aircraft.

BACKGROUND OF THE ART

Heat exchangers can be used for various reasons as part of an aircraft. A very common example of an aircraft heat exchanger is the fuel-oil heat exchanger (FOHE), sometimes referred to as a fuel/oil cooler, which is typically used to simultaneously heat the fuel prior to its injection into the combustion chamber and cool the bearing oil in a gas turbine engine of the aircraft. In an aircraft, costs, maintenance, weight and size can be important considerations when designing the systems. The size of the heat exchanger is typically directly related to its heat exchange capacity. It was known, for instance, to select or design a heat exchanger of a sufficient size to achieve a given temperature requirement for one of the flows, while keeping the size and weight of the heat exchanger at an acceptable minimum. There is an ever-present need for improvements in the field of aircraft heat exchangers and their methods of use.

SUMMARY

In one aspect, there is provided a gas turbine engine comprising: a first conduit extending from at least one first conduit inlet through a heat exchanger to at least two first conduit outlets; a second conduit extending from at least one second inlet through the heat exchanger to at least one second outlet, the first and second conduits disposed adjacent to one another in heat exchange engagement within the heat exchanger; and a bypass conduit extending from the first conduit between the at least one first inlet and the heat exchanger to the first conduit between the heat exchanger and at least one of said at least two first outlets.

In another aspect, there is provided an aircraft heat exchanger system comprising: a first conduit extending from at least one first conduit inlet through a heat exchanger to at least two first conduit outlets; a second conduit extending from at least one second inlet through the heat exchanger to at least one second outlet, the first and second conduits disposed adjacent to one another in heat exchange engagement within the heat exchanger; and a bypass conduit extending from the first conduit between the at least one first inlet and the heat exchanger to the first conduit between the heat exchanger and at least one of said at least two first outlets.

In a further aspect, there is provided a method of exchanging heat between fluids, the method comprising the steps of: exchanging heat between a first portion of a first fluid flow at a first temperature and a second fluid flow in a heat exchanger, thereby bringing the first portion of the first fluid flow at a second temperature; downstream of the heat exchanger, conveying the first portion of the first fluid flow along at least a first branch and a second branch leading to corresponding outlets; and conveying a second portion of the first fluid flow at the first temperature to at least one of said first branch and second branch and thereby providing different fluid flow temperatures at the respective outlets.

DESCRIPTION OF THE DRAWINGS

Reference is now made to the accompanying figures in which:

FIG. 6 is a schematic representation of a heat exchanger system in accordance with a fifth embodiment.

DETAILED DESCRIPTION

Figure 1:
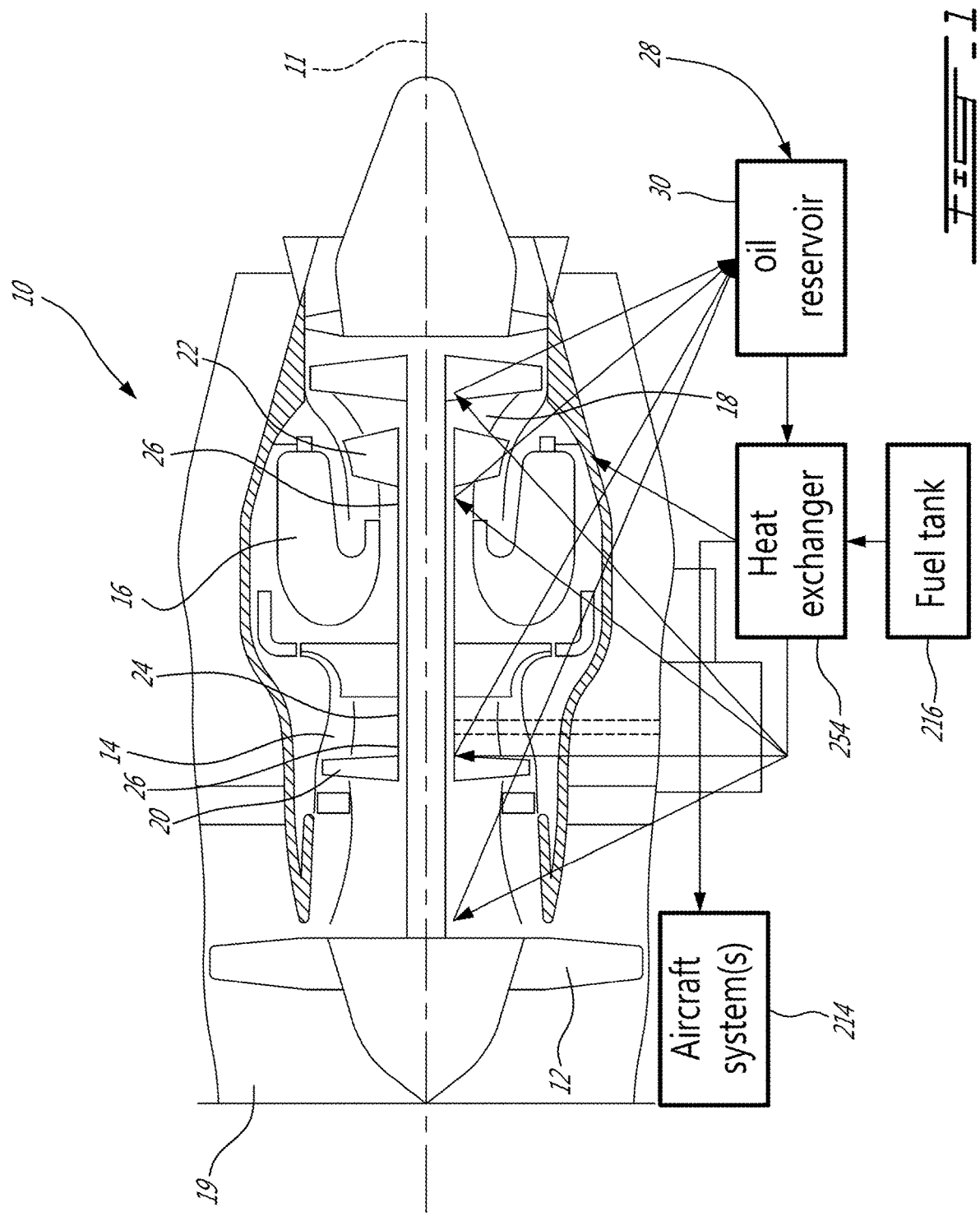
FIG. 1 is a schematic cross-sectional view of a gas turbine engine.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. More specifically, the gas turbine engine 10 has a core gas path including an intake 19 for receiving air. The compressor section 14 has at least one compressor 20 extending across the core gas path and the turbine section 18 has at least one turbine 22 extending across the core gas path, with the compressor 20 and the turbine 22 being made integral to a rotary shaft 24 supported within the gas turbine engine 10 by bearings 26, and an oil system 28 is provided for circulating oil to the bearings 26 and back to an oil reservoir 30.

Figure 2:
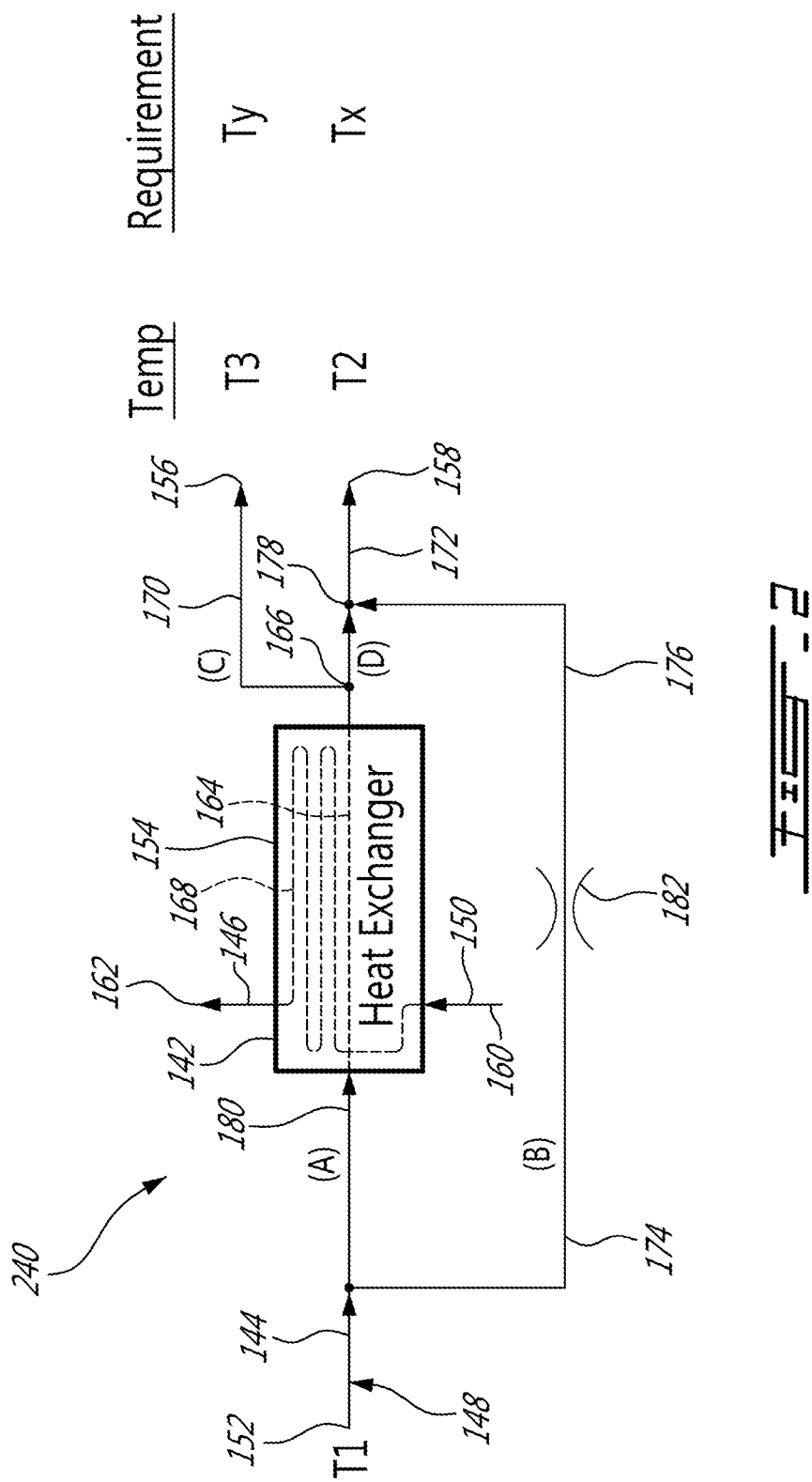
FIG. 2 is a schematic representation of a heat exchanger system in accordance with a first embodiment.

FIG. 2 schematically shows an aircraft heat exchanger system 240. The aircraft heat exchanger system 240 has a heat exchanger 142 which is used for exchanging heat between a first fluid flow 144 and a second fluid flow 146 during operation.

The aircraft heat exchanger system 140 has some form of first conduit 148 for guiding the first fluid flow 144, and some form of second conduit 150 for guiding the second fluid flow 146. The first conduit 148 will generally be said to have at least one first conduit inlet 152 leading to the heat exchanger 154, and at least two first conduit outlets 156, 158 downstream of the heat exchanger 154. The second conduit 150 will generally be said to have at least one second conduit inlet 160 leading to the heat exchanger 154, and at least one second conduit outlet 162 downstream of the heat exchanger 154.

It will be noted that the operation of the heat transfer system 240 can involve transferring heat from the first fluid flow 144 to the second fluid flow 146, and thus heating the first fluid flow 144 while cooling the second fluid flow 146, or vice-versa (cooling the first fluid flow 144 by heating the second fluid flow 146). The first fluid flow 144 can be of a different fluid than the second fluid flow 146, or both fluid flows 144, 146 can be of the same fluid of different temperatures. The fluid or fluids involved can be air, oil, fuel or any other suitable fluid depending on the application. In a scenario where the first fluid flow 144 is heated by the second fluid flow 146, this would mean that Tx was above Ty, whereas in a scenario where the first fluid flow was cooled by the second fluid flow, this would mean that Tx was below Ty.

Depending on the application, the heat exchanger can have various forms. The heat exchanger can have distinct flow paths therein for the first fluid flow and for the second fluid flow. The flow paths being designed to prevent mixing of the fluid flows and thus involve some form of partition system, but are also designed in a manner to favor heat transfer between the flows and so the partitions typically have a high thermal conductivity and are also configured in a manner to favor heat transfer. The first flow path 164 and the second flow path 168 can be said to form part of the first conduit 148 and of the second conduit 150, respectively. The first flow path 164 and the second flow path 168 can be said to be adjacent one another and in heat transfer engagement with one another within the heat exchanger 154. The first flow path 164 in the heat exchanger 154 can be considered to form part of the first conduit 148 and the second flow path 168 in the heat exchanger can be considered to form part of the second conduit 150. The first conduit 148 and second conduit 150 are persistent components of the aircraft, independently of whether the heat exchange system 140 is in operation of not, whereas the corresponding fluid flows 144, 146 may only be conveyed therein during operation.

In the embodiment shown in FIG. 2, the first conduit 148 has two first conduit outlets 156, 158 leading to different systems of the aircraft, and having different temperature requirements Tx, Ty. More specifically, the first conduit 148 branches off to the two first conduit outlets 156, 158 at a node 166 (typically referred to as a tee in the art) located downstream of the heat exchanger 154 and can be said to have a first outlet branch 170 leading to the first outlet 156 having temperature requirement Tx, and a second outlet branch 172 leading to the second outlet 158 having a temperature requirement Ty.

The heat exchange capacity of the heat exchanger 154 can be selected as a function of the most stringent of the two temperature requirements, say requirement Tx associated to the first outlet 156 in this case. The heat exchange capacity of the heat exchanger 154 is typically directly related to the size and weight of the heat exchanger 154. The heat exchanger 154 can change the temperature of the fluid circulating thereacross from, say, temperature T1 to temperature T3. In the absence of any additional factor, during operation, the fluid temperature would be T3 at both outlets, and would thus, at the second outlet 158 be continuously in excess of the corresponding requirement Ty by at least the temperature difference $\Delta T$ between Tx and Ty. It was found that this temperature difference can be associated to wasted energy, because in fact, if it was possible to satisfy only the requirement Ty at the second outlet 158, the overall heat transfer capacity of the heat exchanger 154 could be reduced, potentially leading to a weight or size reduction of the heat exchanger.

FIG. 2 schematically shows an embodiment of a heat exchanger system 240 in which the temperature of the flow exiting the second outlet can be more specifically matched to the associated temperature requirement Ty, and in which the heat exchanger may thus be capable of being downsized while still satisfying temperature requirement Tx. To this end, the heat exchanger system 240 further comprises a bypass conduit 174 which conveys a second portion of the first fluid flow 144, which can be referred to as a bypass flow 176, around the heat exchanger 154. The bypass conduit reconnects the first conduit 148 directly into the second outlet branch 172. Accordingly, the first portion of the first fluid flow 144, which goes into the heat exchanger 154, changes its temperature from T1 to T3 to meet the first temperature requirement Tx. A portion of the first fluid flow 144 exiting the heat exchanger 154 is conveyed directly along the first outlet branch 170, to the first outlet 156, where it is at temperature T3 and satisfies the corresponding outlet requirement. Another portion of the first fluid flow 144 exiting the heat exchanger 154 is conveyed along the second outlet branch 172 at temperature T3, until it reaches a node 178 where it is mixed with the bypass flow 176. The bypass flow 176 bypasses the heat exchanger 154, and is thus still at temperature T1. Accordingly, when it mixes with into the fluid flow of temperature T3 in the second outlet branch 172 it brings the fluid flow to an intermediate temperature T2 at the second outlet 158. The heat exchanger system can be designed in a manner for intermediate temperature T2 to satisfy the second temperature requirement Ty, while not requiring the heat transfer capacity which would be required to make it satisfy the first temperature requirement Tx.

In the embodiment shown in FIG. 2, the relative flow rates between the portion of the main flow 180 conveyed across the heat exchanger 154, the bypass flow 176, the first outlet branch 170 and the second outlet branch 172 are passively controlled. This passive control can be sufficient to provide satisfactory temperatures at the outlets 156, 158 to meet the temperature requirements. For instance, in this embodiment, a flow meter 182 is provided in the bypass conduit 174 to allow a predetermined proportion of the first flow 144 to bypass the heat exchanger 154. The flow meter 182 can be an orifice having specific dimensions/configuration for instance, such as known in the art. Passive flow rate control can provide the advantage of simplicity which can manifest itself in terms of lower cost components, lower weight, lower size, lower maintenance, etc. In this embodiment, the bypass conduit 174 has a passive flow meter 182 controlling the relative flow rates between the bypass conduit 174 and the first fluid path 164 of the heat exchanger 154.

Alternately, the relative flow rates can be actively controlled by way of control valves. Active control can represent greater weight, maintenance, size and/or costs than passive control. However, to a certain extent, this can be justified in certain embodiments, by the advantages stemming from the added control. Indeed, some embodiments can have fluid flow temperatures which can significantly vary depending on operating conditions, or even have temperature requirements which can vary over time. Active control can allow to adapt the relative flow rates as a function of such changing conditions.

Figure 3:
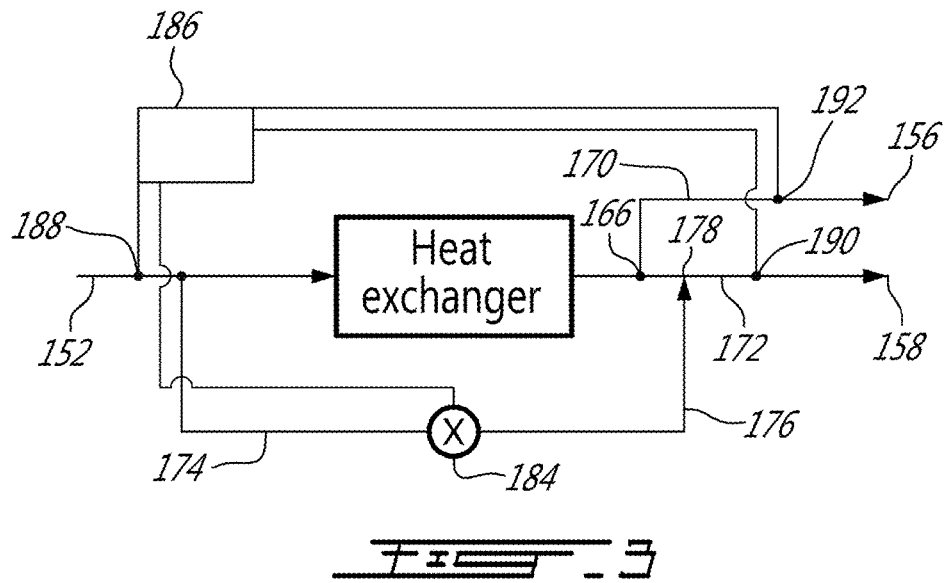
FIG. 3 is a schematic representation of a heat exchanger system in accordance with a second embodiment.

A first schematic example of an alternate embodiment having active flow control is presented in FIG. 3. The embodiment shown in FIG. 3 is similar to the embodiment shown in FIG. 2. However, it has a control valve 184 instead of a flow meter 182 in the bypass conduit 174. The control valve 184 can be operated to control the relative flow rate flowing in the bypass conduit 174, to vary the temperature at the second outlet 158 within a corresponding temperature range. The operation of the control valve 184 can also affect pressure and flow rate. An active system can be automatically controlled, and can have a manual override capability in some embodiments. Automatic control typically involve some form of computer or electronic circuit which will be referred to herein as a controller 186. This controller 186 is adapted to operate the valve 184 based on inputs and integrated logic. The logic can be integrated in the form of software, hardware, or both. The inputs can include one or more temperature sensors 188, 190, 192. Other inputs can be used, such as inputs representative of other changing conditions. In the embodiment shown in FIG. 3, three temperature sensors 188, 190, 192 are used, at the first conduit inlet 152, and at the two first conduit outlets 156, 158, respectively. The controller 186 can communicate with the sensors 188, 190, 192 and with the valve 184 in a wired or wireless manner. In the embodiment shown in FIG. 4, the bypass flow 176 is prevented from entering the first outlet branch 170. This can be achieved via use of a check valve (not shown), for instance, which can be positioned between the node 178 immediately upstream of the outlet branches, and the node 166 where the bypass conduit 174 and the second outlet branch 172 meet.

Figure 4:
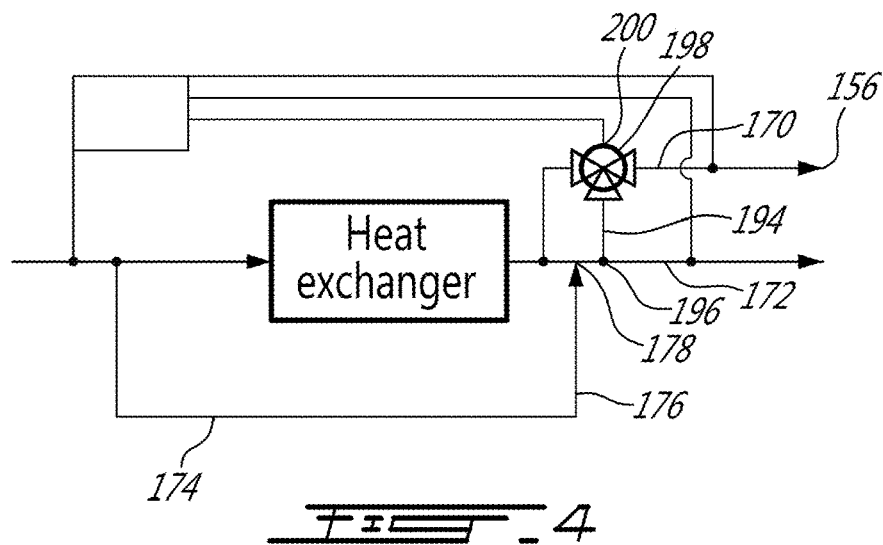
FIG. 4 is a schematic representation of a heat exchanger system in accordance with a third embodiment.

A second schematic example of an alternate embodiment having active flow control is presented in FIG. 4. The embodiment shown in FIG. 4 is also similar to the embodiment shown in FIG. 2. However, it has an auxiliary branch 194 extending from a node 196 located downstream of the node 178 where the bypass conduit 174 connects the second outlet branch 172 to a node 198 located along the first outlet branch. This latter node 198 has a control valve 200 which can control the relative amount of auxiliary flow which is allowed into the first outlet branch 170. It will be understood that the auxiliary flow in the auxiliary branch 194 can include some of the bypass flow 176 from the bypass conduit 174. The adjustment of the auxiliary flow can allow to adjust the temperature of the first outlet 156 between a corresponding temperature range. This adjustment can also affect pressure and flow rate of the first outlet 156.

In the two preceding embodiments, a control valve (184 or 200, respectively) is adjustable during operation to change a flow rate of the bypass flow across at least one of the at least two first conduit outlets and thereby change the relative temperatures of the flows across the at least two first conduit outlets.

It will be noted that the embodiments presented above are shown with two first conduit outlets for simplicity, and that some alternate embodiments can have three or more outlets with associated temperature requirements, for instance. Similarly, alternate embodiments can have more than one inlet.

Figure 5:
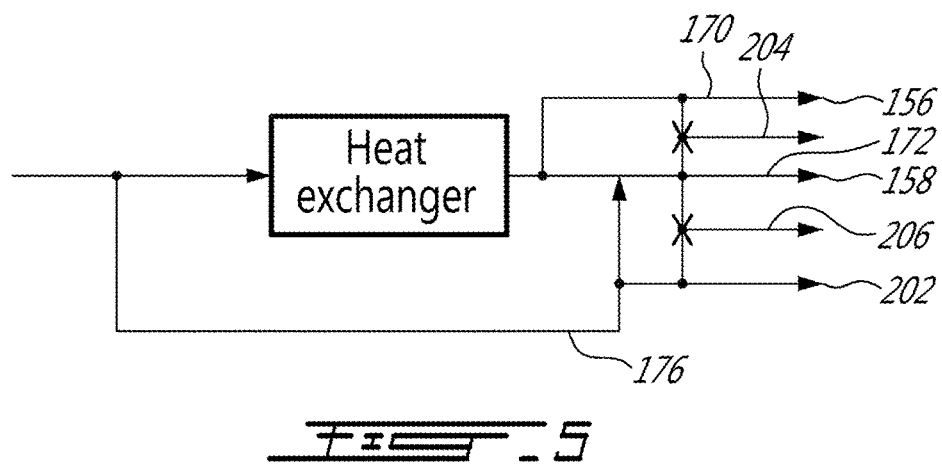
FIG. 5 is a schematic representation of a heat exchanger system in accordance with a fourth embodiment.

An example of an embodiment having 5 outlets and passively providing 5 different requirements is shown in FIG. 5. This embodiment is similar to the embodiment shown in FIG. 2. However, a portion of the bypass flow 176 is branched directly to a third outlet 202 which does not have any specific temperature requirement and does not need to receive heat exchange at all. Moreover, two intermediary branches 204, 206 are provided including a first intermediary branch 204 and a second intermediary branch 206. The first intermediary branch 204 is connected to both the first outlet branch 170 and the second outlet branch 172, and outputs fluid at a temperature between the first outlet 156 and the second outlet 158. Similarly, the second intermediary branch 206 is connected to both the second outlet branch 172 and the branch of the third outlet 202 and outputs fluid at a temperature between the second outlet 158 and the temperature of the bypass flow 176. Still further modifications are possible in alternate embodiments.

FIG. 6 shows a specific example of a heat exchanger system 210 which can be applied to a gas turbine engine 10 such as the one shown in FIG. 1. The gas turbine engine 10 can be a small gas turbine engine such as model PW 815 manufactured by Pratt & Whitney Canada for instance.

In this example, fuel is fed into the heat exchanger system 210 at a given flow rate for use as the first fluid. The heat exchanger system 210 forms part of greater fuel system 212, and point 252 will be considered the inlet of the heat exchanger system. A minor portion of the fuel is branched off directly from the heat exchanger along a first branch 270 to feed an aircraft system 214. The aircraft system 214 has a temperature requirement of 95° F. which is the most stringent requirement in the fuel system 212. The major portion of the fuel is fed to a second branch 272 which has a lesser temperature requirement. In the embodiment shown, the first branch 270 and the second branch 272 stems from a node 266 that is located downstream of the heat exchanger 254. In this embodiment, the aircraft system 214 has a valve 218 which can be selectively opened or closed. The fuel entering the heat exchanger 254 may be at 32° F. The heat exchanger 254 is designed in a manner to satisfy the 95° F. requirement for the associated flow rate. The second fluid flow 146 which is used to heat the fuel is oil, which can come from the bearing system 28. Indeed, as shown in FIG. 1, it is typical of gas turbine engines 10 to have rotary shafts 24 supported by bearings 26 which are continuously fed with oil. The oil is then collected in scavenge lines and collected in an oil reservoir 30, filtered, and recycled back to the bearing cavities. This oil can be used in this embodiment as the second fluid flow 146 in the heat exchanger 254 to heat the fuel.

In a simulation performed with the example system configuration illustrated in FIG. 6, it was found that more than half of the fuel from the inlet 252 could bypass the heat exchanger 254 while still satisfying both the aircraft system's temperature and flow rate requirements and simultaneously satisfying the lesser temperature requirement of the second branch 272. More specifically, the heat transfer capacity was reduced by more than 10%, and the heat exchanger's weight could be reduced to less than half of the weight which would have been required when compared to a scenario without a bypass conduit 274.

More specifically, the example system presented in FIG. 6 begins with a fuel source 216 which could be as low as −40° F. This fuel is pumped with a low pressure pump 220 and directed to a filter 222. The second branch 272 from the heat exchanger 254 mixes into this fuel line upstream of the filter 222. The second temperature requirement is a requirement that the fuel reaching the filter be at at least 32° F. The second branch 272 from the heat exchanger system 210 forms part of a recirculation loop 224 which recirculates more than twice the flow rate of fresh fuel obtained from the low pressure pump 222 across the filter 222 and back into the heat exchanger 254. The recirculated fuel from the second branch 272 heats the low temperature fuel from the low pressure pump 220 in a manner to satisfy the second temperature requirement. A high pressure pump 226 increases the pressure of the fuel downstream of the filter 222. A combustion chamber supply line 228 tees off between the high pressure pump 226 and the heat exchanger 254, removing a minor proportion of the flow rate of fuel from the recirculation loop 224 and injecting it into the combustion chamber 16.

In this embodiment, an additional advantage was obtained when compared with a scenario without a bypass flow. Since it was possible to take the second temperature requirement specifically into consideration rather than ignoring it entirely, it was possible to achieve more uniform margins with the two different temperature requirements. More specifically, in this simulation, the margin with both the first temperature requirement and the second temperature requirement were of between 6 and 12°. In the scenario without a bypass flow, the margin was much smaller on the first temperature requirement.

The above description is meant to be exemplary only, and one skilled in the art will recognize that changes may be made to the embodiments described without departing from the scope of the invention disclosed. For example, an oil to fuel heat exchanger was provided as an example, but other forms of heat exchangers can be used, such as air to air or oil to oil, on other areas of an aircraft and for other uses than the one described above. Depending on the application, different aircraft systems can have different pressure or temperature requirements which can be accommodated with a bypass flow such as presented herein. For instance, engines with a reduction gear box (RGB) may require cooler temperature oil feed for lubrication than the oil fed for lubrication to the rest of the engine (ex., turboprop or geared turbofan engines). Accordingly, an embodiment can be provided where the first fluid flow is oil, and first outlet leads to a reduction gearbox, and the second outlet leads to a lubrication subsystem for the rest of the engine. Another example is air bled from the compressor stage of a turbomachine, which can be used for various purposes, each may have different temperature and/or pressure requirements. Examples of bleed air uses can include turbine blade cooling, bearing cavity sealing, anti-ice systems, active clearance control, customer bleed to airframe, etc. Accordingly, an embodiment can be provided where the first fluid flow is bleed air, and different outlets at different pressure or temperatures are provided for two or more of the example bleed air systems presented above, and/or other bleed air systems. As presented above, passive control can be preferred over active control, but some embodiments may be more adapted to active control. Indeed, valves that require control tend to be heavy (e.g. fluid-driven control). Larger engines typically have several output targets and may already have active control (controlled valves and temperature monitor) so we are perhaps not adding any weight by using a controllable valve. Moreover, although the examples presented above use the bypass to achieve different temperature requirements, there can be an advantage in using the bypass for achieving different pressure requirements. Indeed, heat exchangers cause a pressure drop. Surprisingly, changes to the heat exchanger to achieve a same temperature change with a varying relative amount of bypass flow can affect the pressure drop in a different proportion than the proportion of the flow which is bypassed. This lead to interesting results. For instance, in some embodiments, it can be preferred to achieve a greater temperature change with a smaller amount of fluid in the heat exchanger, to achieve a given pressure drop across the heat exchanger, and then compensate both the pressure and the temperature by recombining the bypass flow, in a manner to require a less heavy or voluminous heat exchanger than in a scenario without a bypass flow. This can be advantageous even in a scenario having a single outlet/temperature requirement. Still other modifications which fall within the scope of the present invention will be apparent to those skilled in the art, in light of a review of this disclosure, and such modifications are intended to fall within the appended claims.

The invention claimed is:

1. A fuel system for an aircraft for flowing fuel from a fuel source to two systems having different temperature requirements, comprising:
a heat exchanger having a first conduit and a second conduit in heat exchange relationship with the first conduit, the second conduit configured to flow a lubricant of an oil system of the aircraft, the first conduit having an inlet fluidly connected to the fuel source;
two outlet branches fluidly connected to a node, the node fluidly connected to the first conduit downstream of the heat exchanger, each of the two outlet branches fluidly connected to a respective one of the two systems; and
a bypass conduit having an inlet fluidly connected, upstream from the heat exchanger, to the first conduit and an outlet fluidly connected to one of the two outlet branches downstream of the node, the bypass conduit bypassing the heat exchanger such that fuel flowing within the bypass conduit is mixed with fuel flowing within the one of the two outlet branches to create a temperature difference between temperatures of the fuel provided to the two systems via the two outlet branches.

2. The fuel system of claim 1, wherein the bypass conduit has a flow meter.

3. The fuel system of claim 1, comprising a control valve operatively connected to the bypass conduit and/or to the two outlet branches and operable for varying a flow rate of the fuel to vary outlet temperatures at outlets of the two outlet branches.

4. The fuel system of claim 1, wherein one of the two systems is an aircraft system and the other of the two systems is a combustor of a gas turbine engine of the aircraft, the aircraft system fluidly connected to the other of the two outlet branches, the combustor fluidly connected to the one of the two outlet branches.

5. The fuel system of claim 1, further comprising an auxiliary branch extending between the two outlet branches.

6. The fuel system of claim 1, further comprising at least a third outlet branch extending between the heat exchanger and a third outlet, and wherein both of the two outlet branches are connected to the third outlet branch.

7. The fuel system of claim 1, wherein the two systems are an aircraft system and a combustion chamber, a fuel line fluidly connecting the fuel source to the combustion chamber, and a fuel filter fluidly connected to the fuel line between the fuel source and the combustion chamber, the one of the two outlet branches connected to the fuel line upstream of the fuel filter, the other of the two outlet branches fluidly connected to the aircraft system.

8. The fuel system of claim 7, wherein the inlet of the first conduit is connected to the fuel line downstream of the fuel filter.

9. A gas turbine engine comprising a fuel system for flowing fuel from a fuel source to a first system having a first temperature requirement and from the fuel source to a second system having a second temperature requirement different than the first temperature requirement, the fuel system having:
a first conduit having at least one first conduit inlet fluidly connected to the fuel source, the first conduit extending through a heat exchanger to at least two first conduit outlets via at least two outlet branches stemming from a node located downstream of the heat exchanger;
a second conduit extending from at least one second conduit inlet through the heat exchanger to at least one second conduit outlet, the first and second conduits disposed adjacent to one another in heat exchange engagement within the heat exchanger, the second conduit configured to flow a second fluid; and
a bypass conduit extending from a first position along the first conduit between the at least one first conduit inlet and the heat exchanger to a second position along a first outlet branch of the at least two outlet branches between the heat exchanger and a corresponding one of the at least two first conduit outlets, the second position located downstream of the node,
the first outlet branch of the at least two outlet branches fluidly connected to the second system, a second outlet branch of the at least two outlet branches fluidly connected to the first system.

10. The gas turbine engine of claim 9, wherein the bypass conduit has a flow meter.

11. The gas turbine engine of claim 9, comprising a control valve operatively connected to the fuel system and operable for varying a flow rate of the fuel within the bypass conduit and/or within the at least two outlet branches to vary outlet temperatures at the at least two first conduit outlets.

12. The gas turbine engine of claim 9, wherein the at least two first conduit outlets include a first outlet and a second outlet, and wherein the second outlet branch extends between the heat exchanger and the second outlet, and the first outlet branch extends between the heat exchanger and the first outlet, wherein the bypass conduit is connected to the first outlet branch.

13. The gas turbine engine of claim 12, further comprising an auxiliary branch extending between the second outlet branch and the first outlet branch.

14. The gas turbine engine of claim 13, further comprising a control valve in at least one of said bypass conduit and said auxiliary branch.

15. The gas turbine engine of claim 12, wherein the first branch is separate from the second branch.

16. The gas turbine engine of claim 12, further comprising at least a third outlet branch extending between the heat exchanger and a third outlet, and wherein both the first outlet branch and the second outlet branch are connected to the third outlet branch.

17. The gas turbine engine of claim 11, wherein the control valve is one of:

a two-way valve fluidly connected to the bypass conduit between the first position and the second position; or a three-way valve having an inlet fluidly connected to the second outlet branch of the at least two outlet branches downstream of the node, the three-way valve having a first outlet fluidly connected to the first system and a second outlet fluidly connected to the first outlet branch of the at least two outlet branches.

18. The gas turbine engine of claim 11, further comprising at least one temperature sensor and a controller operatively connected to the at least one temperature sensor, wherein said controller is operatively connected to the control valve to control the control valve based on an input from the at least one temperature sensor, the at least one temperature sensor operatively connected to one or more of: the at least one first conduit inlet, the first outlet branch of the at least two outlet branches, and/or the second outlet branch of the at least two outlet branches.

19. The gas turbine engine of claim 9, wherein the first system is an aircraft system and wherein the second system is a combustion chamber, the fuel system having a fuel line fluidly connecting the fuel source to the combustion chamber of the gas turbine engine, and a fuel filter fluidly connected to the fuel line between the fuel source and the combustion chamber, the first outlet branch of the at least two outlet branches connected to the fuel line upstream of the fuel filter, the second outlet branch of the at least two outlet branches fluidly connected to the aircraft system.

20. The gas turbine engine of claim 19, wherein the at least one first conduit inlet is connected to the fuel line downstream of the fuel filter.

* * * * *